(12) United States Patent
Naghshvar et al.

(10) Patent No.: US 11,899,411 B2
(45) Date of Patent: *Feb. 13, 2024

(54) HYBRID REINFORCEMENT LEARNING FOR AUTONOMOUS DRIVING

(71) Applicant: Qualcomm Incorporated, San Diego, CA (US)

(72) Inventors: Mohammad Naghshvar, San Diego, CA (US); Ahmed Kamel Sadek, San Diego, CA (US); Auke Joris Wiggers, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,263

(22) Filed: Oct. 24, 2022

(65) Prior Publication Data

US 2023/0280702 A1 Sep. 7, 2023

Related U.S. Application Data

(63) Continuation of application No. 16/683,129, filed on Nov. 13, 2019, now Pat. No. 11,480,972.

(Continued)

(51) Int. Cl.
*G05B 13/02* (2006.01)
*G05D 1/02* (2020.01)
(Continued)

(52) U.S. Cl.
CPC ......... *G05B 13/027* (2013.01); *G05D 1/0088* (2013.01); *G05D 1/0221* (2013.01);
(Continued)

(58) Field of Classification Search
CPC .. G05B 13/027; G05D 1/0088; G05D 1/0221; G05D 1/0231; G05D 1/0257;
(Continued)

(56) References Cited

U.S. PATENT DOCUMENTS 11,372,416 B2 * 6/2022 Shalev-Shwartz ... G05D 1/0278
11,480,972 B2 10/2022 Naghshvar et al.
(Continued)

OTHER PUBLICATIONS

"Dangerous Reckless Driving Behaviors", By Law Offices of Vic Feazell, P.C., Published Feb. 28, 2012, Retrieved from URL: https://www.withviclegal.com/blog/2012/february/dangerous-reckless-driving-behaviors/ (Year: 2012).
(Continued)

*Primary Examiner* — Calvin Cheung
(74) *Attorney, Agent, or Firm* — Patterson & Sheridan LLP

(57) ABSTRACT

A method includes determining a current state of an environment of an autonomous agent, such as a vehicle. The method also includes determining, via a first neural network, a set of actions based on the current state. The method further includes determining whether further analysis of the set of actions is desired. The method selects an action from the set of actions using a model-based solution based on a reward and a risk of the action when further analysis is desired. The method also includes selecting the action from the set of actions according to a metric when further analysis is not desired. The method controls the autonomous agent to perform the selected action.

20 Claims, 9 Drawing Sheets

Related U.S. Application Data

(60) Provisional application No. 62/760,790, filed on Nov. 13, 2018.

(51) Int. Cl.
  *G05D 1/00* (2006.01)
  *G06N 3/045* (2023.01)
  *G06V 10/764* (2022.01)
  *G06V 10/80* (2022.01)
  *G06V 10/00* (2022.01)
  *G06V 20/05* (2022.01)

(52) U.S. Cl.
  CPC ......... *G05D 1/0231* (2013.01); *G05D 1/0257* (2013.01); *G06N 3/045* (2023.01); *G06V 10/00* (2022.01); *G06V 10/764* (2022.01); *G06V 10/811* (2022.01); *G06V 20/05* (2022.01)

(58) Field of Classification Search
  CPC .... G06V 10/764; G06V 10/811; G06V 10/82; G06V 20/56
  See application file for complete search history.

(56) References Cited

U.S. PATENT DOCUMENTS

| | | | |
|---|---|---|---|
| 2014/0142799 A1* | 5/2014 | Ferguson | B60W 30/18163 701/1 |
| 2017/0213458 A1* | 7/2017 | Gordon | E01F 13/04 |
| 2017/0228662 A1 | 8/2017 | Gu et al. | |
| 2017/0262709 A1* | 9/2017 | Wellington | G06V 10/764 |
| 2018/0201273 A1* | 7/2018 | Xiao | B60W 30/18154 |
| 2019/0101917 A1 | 4/2019 | Yao et al. | |

OTHER PUBLICATIONS

Deo N., et al., "Convolutional Social Pooling for Vehicle Trajectory Prediction," ARXIV.ORG, Cornell University Library, 201 Olin Library Cornell University Ithaca, NY 14853,May 15, 2018 (May 15, 2018), XP080879356,9 pages, The whole document.

Gal Y., "Uncertainty in Deep Learning", University of Cambridge, Sep. 2016, 174 pages.

Korattikara A., et al., "Bayesian Dark Knowledge", 29th Annual Conference on Neural Information Processing Systems 2015, vol. 4, pp. 3438-3446.

Lakshminarayanan B., et al., "Simple and Scalable Predictive Uncertainty Estimation using Deep Ensembles", 31st Conference on Neural Information Processing Systems, NIPS 2017, 12 pages.

O'Donoghue B., et al., "The Uncertainty Bellman Equation and Exploration", Oct. 22, 2018, 13 pages.

Osband I., et al., "Deep Exploration via Bootstrapped DQN", Feb. 15, 2016, 17 pages.

Silver D., et al., "Mastering the Game of Go without Human Knowledge", Nature, 2017, vol. 550, pp. 354-359.

Silver D., et al., "Monte-Carlo Planning in Large POMDPs", NIPS 2010, 9 pages.

Sunberg Z.N., et al., "Online Algorithms for POMDPs with Continuous State, Action, and Observation Spaces", Twenty-Eighth International Conference on Automated Planning and Scheduling (ICAPS 2018), 2018, pp. 259-263.

* cited by examiner

HYBRID REINFORCEMENT LEARNING FOR AUTONOMOUS DRIVING

CROSS-REFERENCE TO RELATED APPLICATION

This is a continuation application of U.S. application claims the benefit of U.S. patent application Ser. No. 16/683,129, filed on Nov. 13, 2019, entitled "HYBRID REINFORCEMENT LEARNING FOR AUTONOMOUS DRIVING" which claims benefit of U.S. Provisional Patent Application No. 62/760,790, filed on Nov. 13, 2018, entitled "HYBRID REINFORCEMENT LEARNING FOR AUTONOMOUS DRIVING," the disclosure of which is expressly incorporated by reference herein in its entirety.

BACKGROUND

Field

Aspects of the present disclosure generally relate to reinforcement learning and, more particularly, to a hybrid reinforcement learning system.

Background

An artificial neural network, which may comprise an interconnected group of artificial neurons (e.g., neuron models), is a computational device, or represents a method to be performed by a computational device. The artificial neural network may be used for various applications and/or devices, such as Internet Protocol (IP) cameras, Internet of Things (IoT) devices, autonomous vehicles, and/or service robots.

A neural network may be used for reinforcement learning to solve a Markov decision process (MDP) problem or a partially observable Markov decision process (POMDP) problem. A transition model is a component of a Markov decision process and a partially observable Markov decision process problem. The transition model determines a next state based on an action taken from a current state.

Reinforcement learning solutions may be divided into model-based solutions or model-free solutions. A model-based solution learns (e.g., knows) a transition model. The transition model may be estimated. A model-free solution does not explicitly determine a transition model. Rather, the model-free solution learns a utility function. A combination of a model-based solution and a model-free solution may be referred to as a hybrid reinforcement learning solution. To improve reinforcement learning systems (e.g., model-free, model-based, and hybrid), it would be desirable to consider uncertainty of state-action value functions before determining how to proceed with selecting an action corresponding to a state-action value function.

SUMMARY

In one aspect of the present disclosure, a method includes determining a current state of an environment of an autonomous agent. The method also includes determining, via a first neural network, a set of actions based on the current state. The method further includes determining whether further analysis of the set of actions is desired. The method still further includes selecting an action from the set of actions using a model-based solution based on a reward and a risk of the action when further analysis is desired. The method also includes selecting the action from the set of actions according to a metric when further analysis is not desired. The method further includes controlling the autonomous agent to perform the selected action.

Another aspect of the present disclosure is directed to an apparatus including means for determining a current state of an environment of an autonomous agent. The apparatus also includes means for determining, via a first neural network, a set of actions based on the current state. The apparatus further includes means for determining whether further analysis of the set of actions is desired. The apparatus still further includes means for selecting an action from the set of actions using a model-based solution based on a reward and a risk of the action when further analysis is desired. The apparatus also includes means for selecting the action from the set of actions according to a metric when further analysis is not desired. The apparatus further includes means for controlling the autonomous agent to perform the selected action.

In another aspect of the present disclosure, a non-transitory computer-readable medium with non-transitory program code recorded thereon is disclosed. The program code is executed by a processor and includes program code to determine a current state of an environment of an autonomous agent. The program code also includes program code to determine, via a first neural network, a set of actions based on the current state. The program code further includes program code to determine whether further analysis of the set of actions is desired. The program code still further includes program code to select an action from the set of actions using a model-based solution based on a reward and a risk of the action when further analysis is desired. The program code also includes program code to select the action from the set of actions according to a metric when further analysis is not desired. The program code further includes program code to control the autonomous agent to perform the selected action.

Another aspect of the present disclosure is directed to an apparatus having a memory and one or more processors coupled to the memory. The processor(s) is configured to determine a current state of an environment of an autonomous agent. The processor(s) is also configured to determine, via a first neural network, a set of actions based on the current state. The processor(s) is further configured to determine whether additional analysis of the set of actions is desired. The processor(s) is still further configured to select an action from the set of actions using a model-based solution based on a reward and a risk of the action when further analysis is desired. The processor(s) is also configured to select the action from the set of actions according to a metric when further analysis is not desired. The processor(s) is further configured to control the autonomous agent to perform the selected action.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
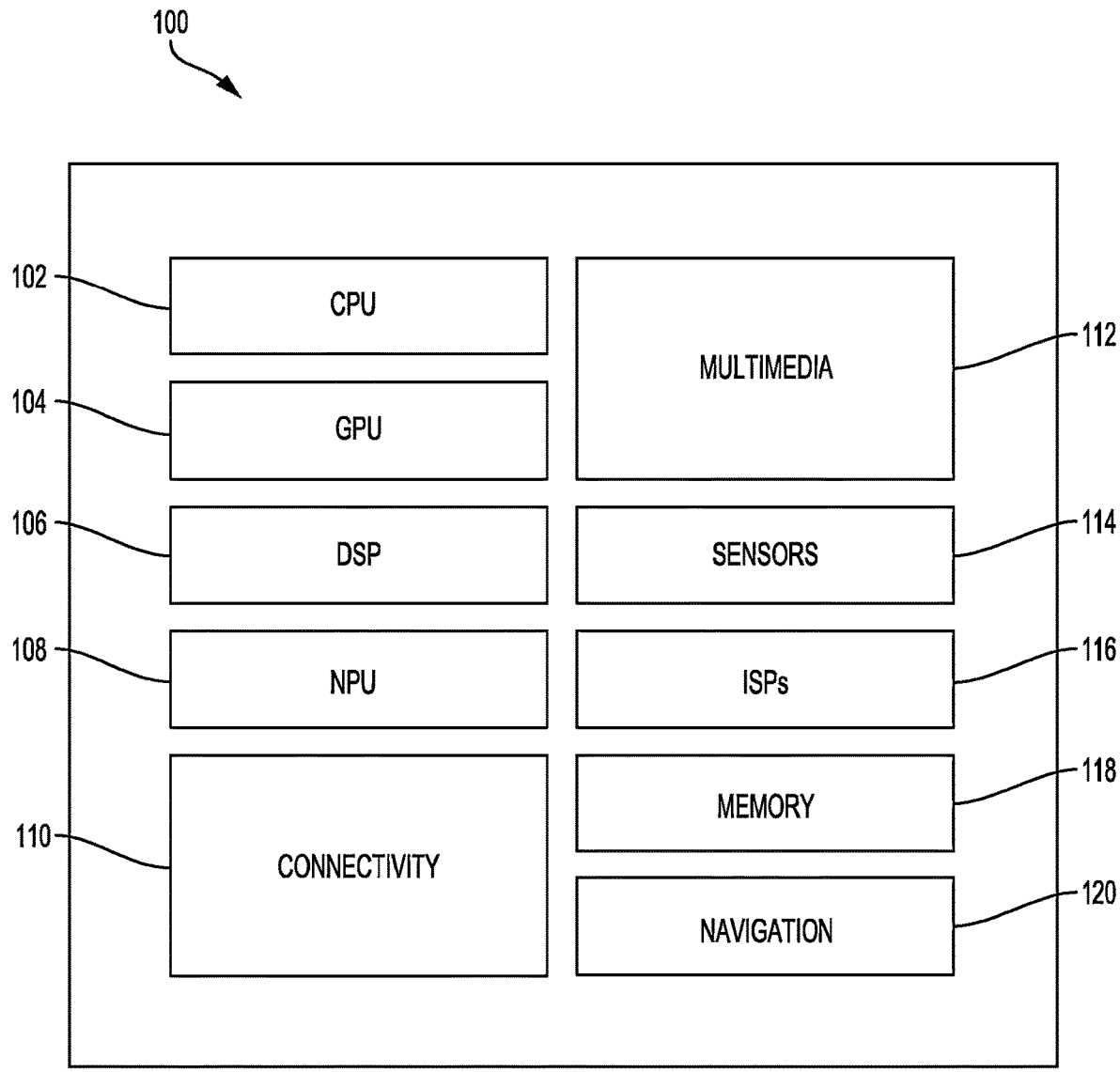
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Behavior planning may be used in tasks involving interactions between decision-making agents. For example, autonomous vehicles use behavior planning for planning and decision-making. In this example, the autonomous vehicle uses a behavior prediction system to predict behaviors of agents in an environment surrounding the autonomous vehicle. The autonomous vehicle may be referred to as an ego agent. The surrounding environment may include dynamic objects, such as autonomous agents and non-autonomous agents. The surrounding environment may also include static objects, such as roads and buildings. One or more sensors, such as a light detection and ranging (LIDAR) sensor, a radio detection and ranging (RADAR) sensor, a camera, and/or another type of sensor, may observe the surrounding environment.

Reinforcement learning may be used to train an agent to perform tasks in an environment. The agent may transition between different scenarios of the environment, referred to as states, by performing actions. Actions, in return, yield rewards, which may be positive, negative, or zero. The agent may be trained to maximize a total reward obtained between an initial state and a terminal state. That is, the agent is reinforced to perform certain actions by providing positive rewards, and to stray away from others by providing negative rewards. The positive and negative rewards may train the agent to develop a strategy (e.g., a policy).

In most cases, each state is a consequence of the previous state and the chosen action. The previous state is also a consequence of the state that came before it, and so on, until the initial state. Accordingly, each step and the order of the step contain information about the current state, and therefore, affect an agent's subsequent action. Still, as the number of steps increases, the amount of information increases. At some point, it may be difficult to determine a subsequent action due to the amount of calculations.

To improve the process of determining actions for sequential decision-making processes, the states of the environment may be considered Markov states, where any state depends solely on the prior state and the transition from the prior state to the current state (e.g., the action performed and the reward). Autonomous driving and other such sequential decision-making processes may be modeled as a partially observable Markov decision process (POMDP), which is defined in terms of states, actions, belief states, and a reward, among other variables. The state space may include, for example, position, orientation, velocity, acceleration, class (car, truck, bike, pedestrian, etc.), indicators (turn signal, brake light, etc.) for the self-driving vehicle (e.g., ego vehicle), and other vehicles. The action space may include high-level options, such as adaptive cruise control, merging, lane changing, and other actions. Each high-level option may specify a configuration of one or more parameters that determine how the option is executed, such as a safe time headway, a minimum distance from a lead vehicle, a maximum desired velocity/acceleration/deceleration, a level of politeness, a direction and maximum time/distance of lane change, and/or other parameters.

Aspects of the present disclosure are directed to a hybrid reinforcement learning system that uses a model-free solution (e.g., model-free neural network) and a model-based solution to select a best action based on a current state. In addition, the best action may also be based on one or more previous states. For example, the behavior planner may determine an intention of a driver based on current and previous state parameters. The model-based solution may use a neural network, a Monte Carlo tree search (MCTS), and/or variants thereof.

FIG. 1 illustrates an example implementation of a system-on-a-chip (SOC) 100, which may include a central processing unit (CPU) 102 or a multi-core CPU configured for hybrid reinforcement learning in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to observe a current state of an environment of the autonomous vehicle. The general-purpose processor 102 may also comprise code to determine, via a first model-free neural network, a set of actions based on the current state. The general-purpose processor 102 may further comprise code to determine whether further analysis of the set of actions is desired based on a solution implemented by a decision making system. The general-purpose processor 102 may still further comprise code to select an action from the set of actions using a model-based solution based on a reward and a risk of the action when further analysis is desired. The general-purpose processor 102 may also comprise code to select the best action from the set of actions according to a metric when further analysis is not desired. The general-purpose processor 102 may further comprise code to control the autonomous vehicle to perform the best action.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
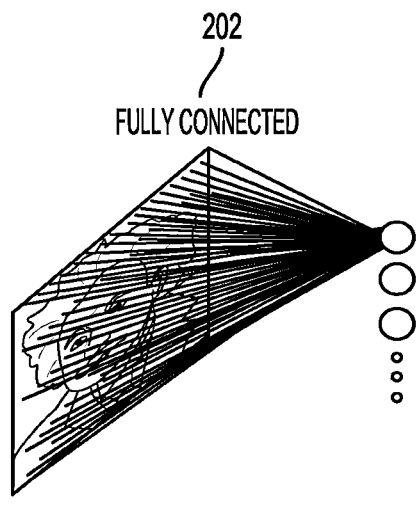
FIGS. 2A, 2B, and 2C are diagrams illustrating a neural network in accordance with aspects of the present disclosure.
Figure 2B:
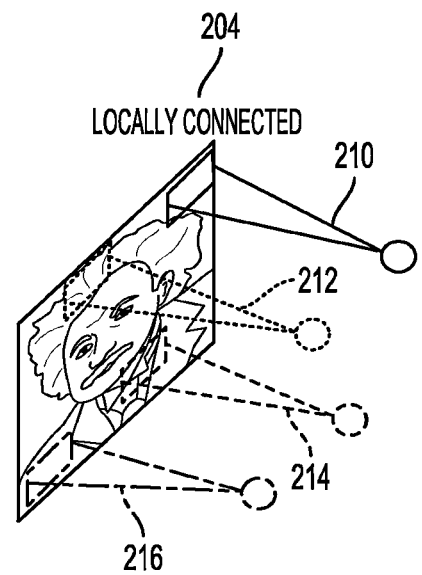

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
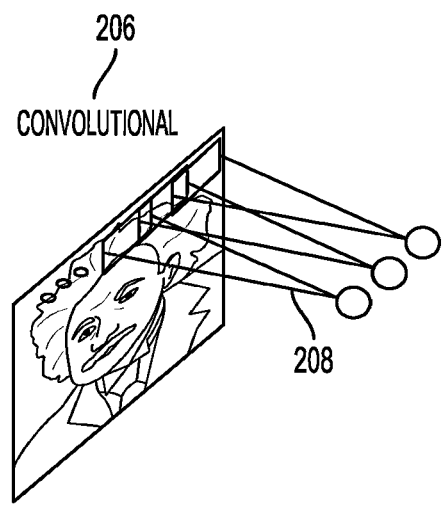

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
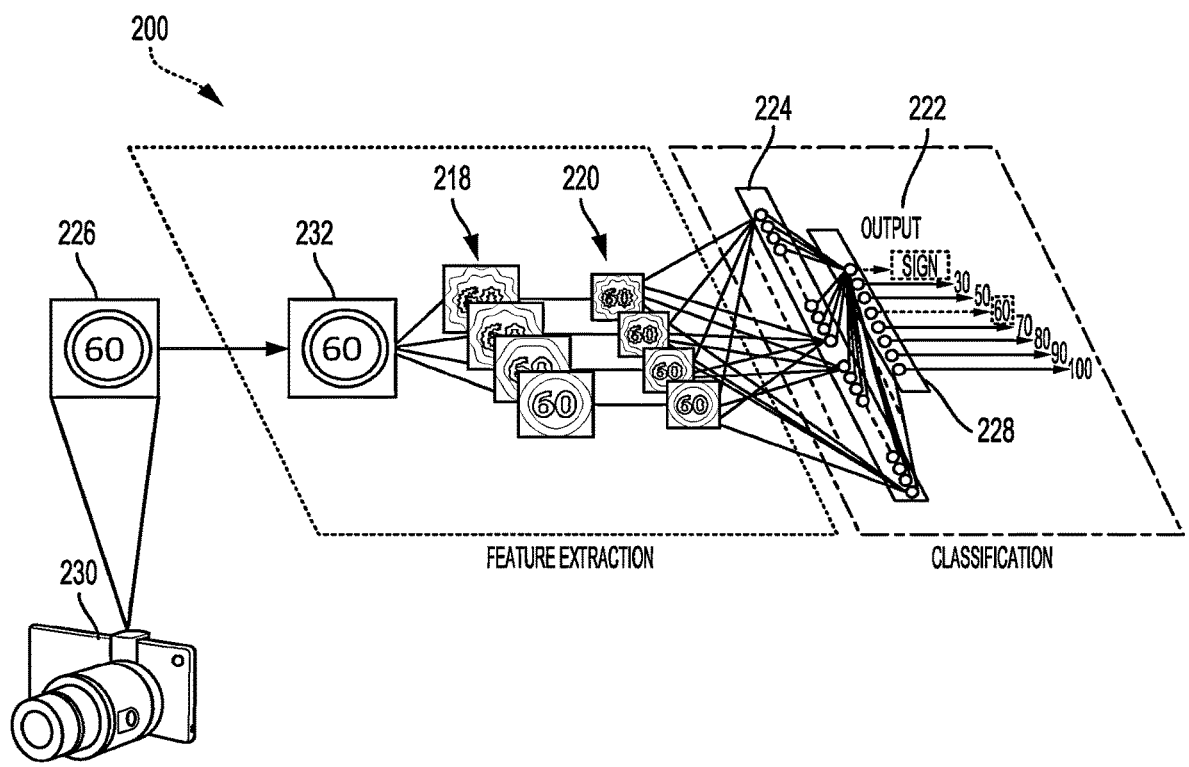
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
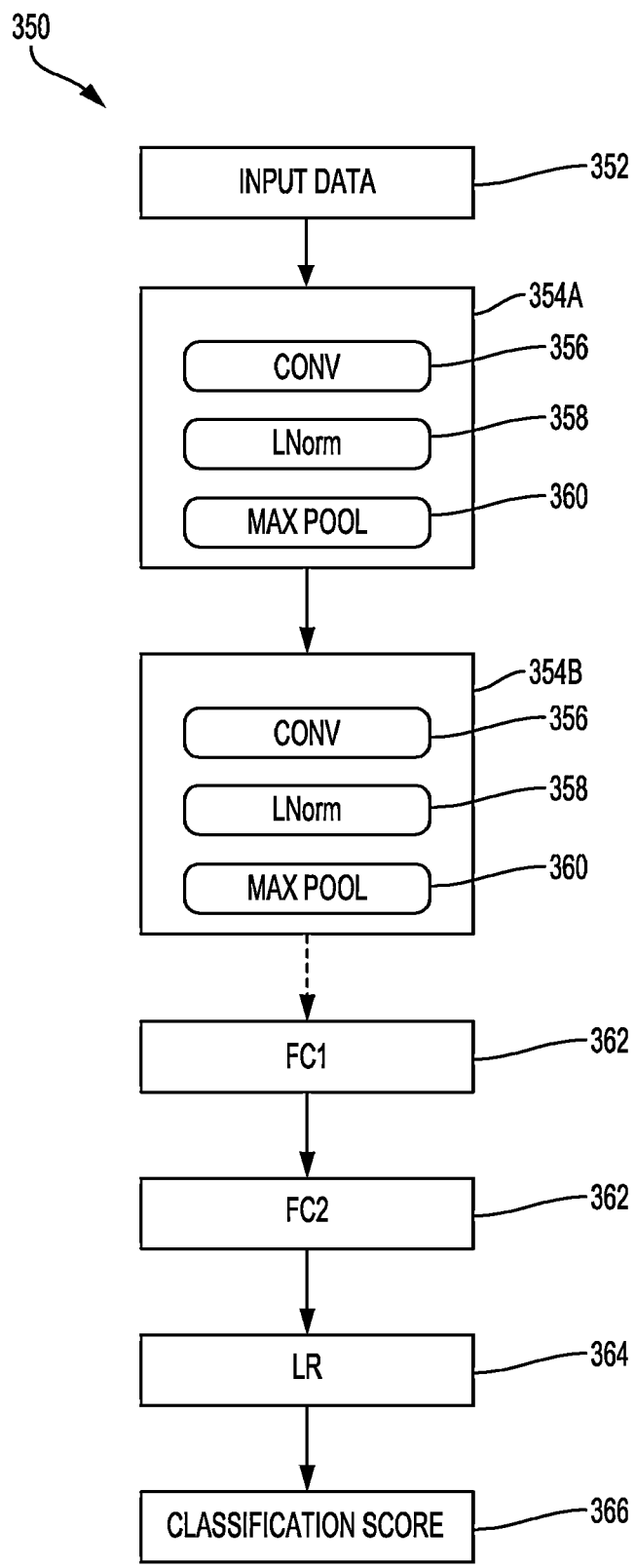
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

The neural networks of FIGS. 2A-2D and 3 are examples of neural networks used for object recognition tasks. Another type of neural network may be a recurrent neural network. In one configuration, a deep reinforcement learning (DRL) network is used for a decision-making task in a reinforcement learning framework. The input to the deep reinforcement learning network may be a state s, such as a 2D image of an environment. The output of the deep reinforcement learning network is a state-action value function Q0 for all available actions a for the given state s (e.g., Q(s, a)). The state-action value function Q0 provides a cumulative reward (e.g., quality (Q) value). The Q value is the sum of the immediate reward from selecting an action a from a state s and the highest Q value possible from a subsequent state (e.g., the state the agent is in after taking action a from state s).

Reinforcement learning (RL) may solve a Markov decision process (MDP) problem or a partially observable Markov decision process (POMDP) problem. A transition model is a component of an MDP and a POMDP problem. The transition model may determine a next state based on an action taken from a current state. As discussed, reinforcement learning solutions may be divided into model-based solutions or model-free solutions. A combination of a model-based solution and a model-free solution may be referred to as a hybrid reinforcement learning solution.

In the model-based reinforcement learning solution, the dynamics (e.g., world dynamics) are known or learned. That is, the model-based reinforcement learning solution knows or learns a transition model. The transition model may be used to evaluate various actions and make a decision. In some cases, the transition model may be inaccurate. The dynamics are known from example trajectories (e.g., example trajectories of an autonomous vehicle) or predefined dynamics (e.g., rules of physics). In one example, for a game such as GO or checkers, the rules of the game are already known. As such, the dynamics of the game are known. That is, when one action is performed, the next state of the game is known. The dynamics may be used to plan an action, such as planning a route. The action may be planned by using a tree search. For simplicity, the model-based reinforcement learning solution may be referred to as a model-based solution.

The model-based solutions may be more sample-efficient than the model-free solutions. That is, model-based solutions may make a decision with a fewer number of examples or data points. Specifically, for neural networks, a network may be data-efficient if the network is trained with fewer data points than other networks. In most cases, a model-free solution uses more training data in comparison to a model-based solution. Still, in conventional model-based solutions, an error in the dynamics may propagate over time, which may cause incorrect decisions.

A model-free reinforcement learning solution does not make an assumption on the dynamics. That is, the model-free reinforcement learning solution is trained using available data and makes decisions without explicitly determining a transition model. Specifically, the model-free reinforcement learning solution learns a policy and/or a value function from example trajectories. The model-free reinforcement learning solution may be trained on examples of actions and corresponding rewards. After training, an action may be recommended based on a current state of the environment. Conventional model-free reinforcement learning solutions are trained on a large set of samples. As such, it may be difficult to train model-free reinforcement learning solutions. Furthermore, the certainty of a decision correlates to the training data. That is, the certainty of a decision in a scenario is decreased when training data for the scenario is limited. The model-free reinforcement learning solution may be referred to as a model-free solution or a model-free neural network.

A hybrid reinforcement learning solution may combine the model-based solution and the model-free solution. Conventional hybrid reinforcement learning solutions train a value function and policy and use the value function and policy to improve a tree search using the dynamics model. The hybrid reinforcement learning solutions may improve the tree search. The hybrid reinforcement learning solution may be referred to as a hybrid solution.

Aspects of the present disclosure are directed to a hybrid solution to solve a problem that may be cast as a partially observable Markov decision process problem or a Markov decision process problem. For example, aspects of the present disclosure may be used to control the actions (e.g., route planning) of an autonomous vehicle.

In one configuration, a neural network (e.g., model-free neural network) is trained to approximate a state-action value function (e.g., Q function) according to a model-free solution (e.g., expected result from a certain state). The state-action value function is trained to determine a reward (e.g., Q value) based on an action from a current state. The neural network may be a deep Q network (DQN), a deep recurrent Q network (DRQN), or another type of neural network.

At any state, the model-free neural network is used to identify the top N actions. The best action may be selected by comparing the N actions via a model-based solution using the known dynamics. In the present disclosure, the state refers to a state in MDP or a belief state in POMDP. The action refers to the next action of an autonomous device. For example, an action may refer to a specific movement of an autonomous vehicle (e.g., turn right). An action from the N actions may be selected based on a Monte Carlo tree search or a Monte Carlo tree search variant that may handle continuous state spaces (e.g., partially observable Monte Carlo planning (POMCP) and partially observable Monte Carlo planning with observation widening (POMCP-OW)). Upper confidence bounds for trees (UCT) or an upper confidence bounds for trees variant may be used to explore the tree. Instead of a rollout in the model-based system, the new tree nodes (after each expansion) may be initialized by the Q values from the model-free neural network.

The decision for applying the model-based solution (e.g., whether to apply a model-based solution to the actions determined from a model-free neural network) may depend on a certainty of an output of the model-free neural network. For example, if a certainty of a Q value for an action is above a threshold, the action is selected as a function of the Q value and a tolerance for a risk of the action. For example, an action may yield a high reward, still the risk of the action may be greater than a threshold. In this example, the action is not selected, and an alternate action may be selected. The risk may correspond to an application. For example, in autonomous driving, the risk may correspond to a potential for collision, a potential recourse use, and/or other factors. In one configuration, the action is selected based on the following function:

$$\mathrm{argmax}_a\{Q(s,a) - a \times \sigma^2(s,a)\}, \qquad (1)$$

where $\sigma^2(s, a)$ denotes the variance (e.g., uncertainty) of $Q(s, a)$, $\alpha$ is a configurable weight, and $Q(s, a)$ provides the Q value (e.g., reward) of taking an action a while at state s. The configurable weight $\alpha$ may be configured by a user based on a tolerance for risk for a given application. The action determined from equation 1 is an action that maximizes the Q value while minimizing the risk. The action from equation 1 may be referred to as the best action.

The standard deviation or other uncertainty measure may be used to determine an uncertainty of a Q value. A bias may be added to the upper confidence bounds for trees for further exploration of actions with an uncertainty that is greater than a threshold. Potential candidates to measure uncertainty are methods using ensemble networks, bootstrapped networks, an uncertainty Bellman equation, an MC-dropout, student-teacher networks, etc.

The action determined by the model-free neural network is an action of an ego agent. For example, an autonomous vehicle may capture a state of an environment, such as a position of other vehicles, a shape of the other vehicles, and the velocity of the other vehicles. Based on the current state, the model-free solution determines an action from possible actions for an autonomous vehicle. The possible actions may include, for example: 1) stay in the lane; and 2) change lanes. If there is uncertainty amongst possible actions, a model-based solution is used to select the action from the possible actions.

As discussed, the best action may be selected by combining Q values of the top N actions from the model-free neural solution(s) and values from the model-based solution(s) (e.g., model-based forward simulation(s)). N may be equal to a size of an action space. In some cases, N may include all actions.

$Q(s, a)$ and $\tilde{Q}(s, a)$ denote Q values of the model-free neural network and model-based solution, respectively. $A_N(s)$ denotes the top N actions based on the neural network model, for example, the N actions with highest Q values (e.g., $Q(s, a)$) or maximum Q values and minimum risk (e.g., equation 1) may be selected. That is, if an uncertainty for a Q value of an action is greater than a threshold, the action may be pruned.

The action may be selected as a function of Q and $\tilde{Q}$. For example, the action a*, from the top N actions, which maximizes the Q value in view of a confidence of a solution may be selected. In one configuration, the action a* is selected as follows, $$a^* = \mathrm{argmax}_{a \in A_N(s)}\{\alpha_1 Q(s, a) + \alpha_2 \tilde{Q}(s, a)\},$$

where $\alpha_1$ and $\alpha_2$ depend on a confidence of the model-free neural network and the model-based solution. The parameters $\alpha_1$ and $\alpha_2$ may be constant parameters (e.g., linear) or a function of an uncertainty in the Q values. For example, $\alpha_1$ and $\alpha_2$ may be inversely correlated to the uncertainty of corresponding Q values (e.g., high uncertainty in a Q value corresponds to a low $\alpha_1$ and/or $\alpha_2$).

In one configuration, if there is a mismatch between the N Q values calculated by the model-free solution and the model-based solution (e.g., between $\{Q(s, a)\}_{a \in A_N(s)}$ (model-free) and $$\{\tilde{Q}(s, a)\}_{a \in A_N(s)}$$

(model-based)), then no action would be recommended by the hybrid reinforcement learning system. For example, a mismatch may be computed by ranking the N actions based on their Q and $\tilde{Q}$ values. A distance between the two permutations may be determined with a metric, such as a Cayley distance, a Kendall distance, or their generalizations.

For autonomous driving, if no action is recommended by the hybrid solution, the system may default to the human driver or a specific safety protocol (e.g., predetermined action). The aspects discussed above may be extended to cases where there are K model-free solutions and M model-based solutions, where the results are either combined as discussed above, or based on a maximum vote, or other approaches.

Figure 4:
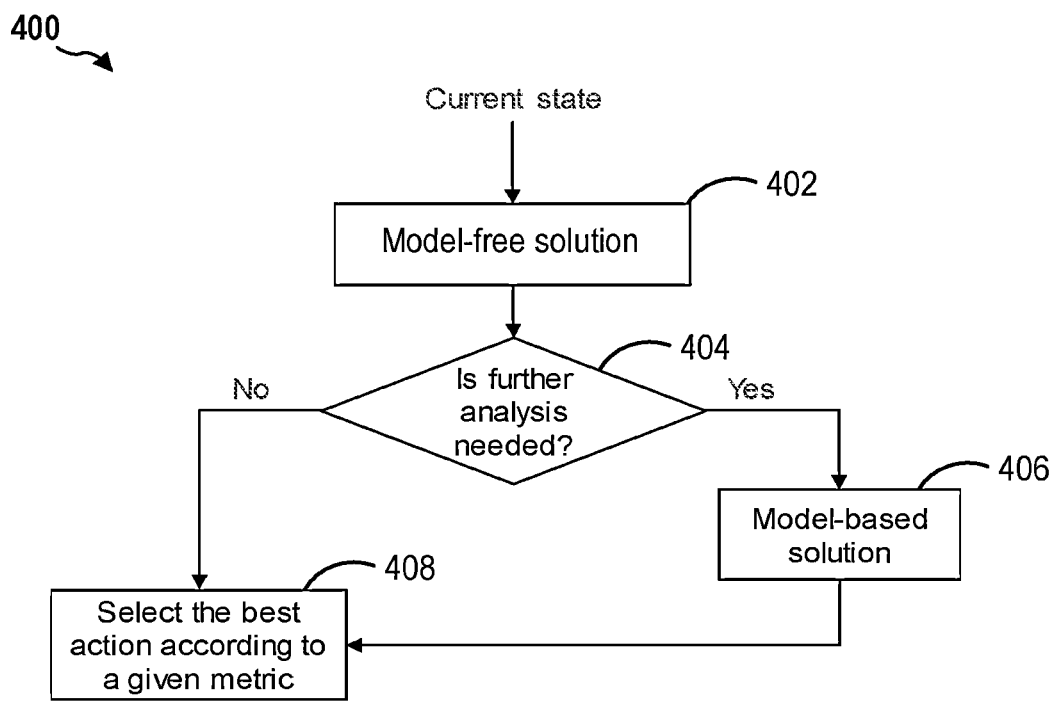
FIGS. 4, 5, and 6 illustrate examples of a reinforcement learning (RL) solutions in accordance with aspects of the present disclosure.

FIG. 4 illustrates an example of a solution 400 according to aspects of the present disclosure. The solution 400 of FIG. 4 may be referred to as an analysis determination solution. As shown in FIG. 4, at block 402, the current state is input to a model-free solution (e.g., model-free neural network). The model-free solution determines actions from the current state. The model-free solution may also prune the actions to determine the top N actions. At block 404, the system determines if further analysis is needed. For example, if the variance of the Q values of the top N actions is greater than a threshold, further analysis may be needed to select the best action.

If further analysis is needed, at block 406, a model-based solution determines the best action from the actions (e.g., top N actions) determined by the model-free neural network. If further analysis is not needed, at block 408, the best action is selected from one of the actions determined by the model-free neural network. The best action may be selected based on a metric. For example, the best action may be selected based on equation 1.

Figure 5:
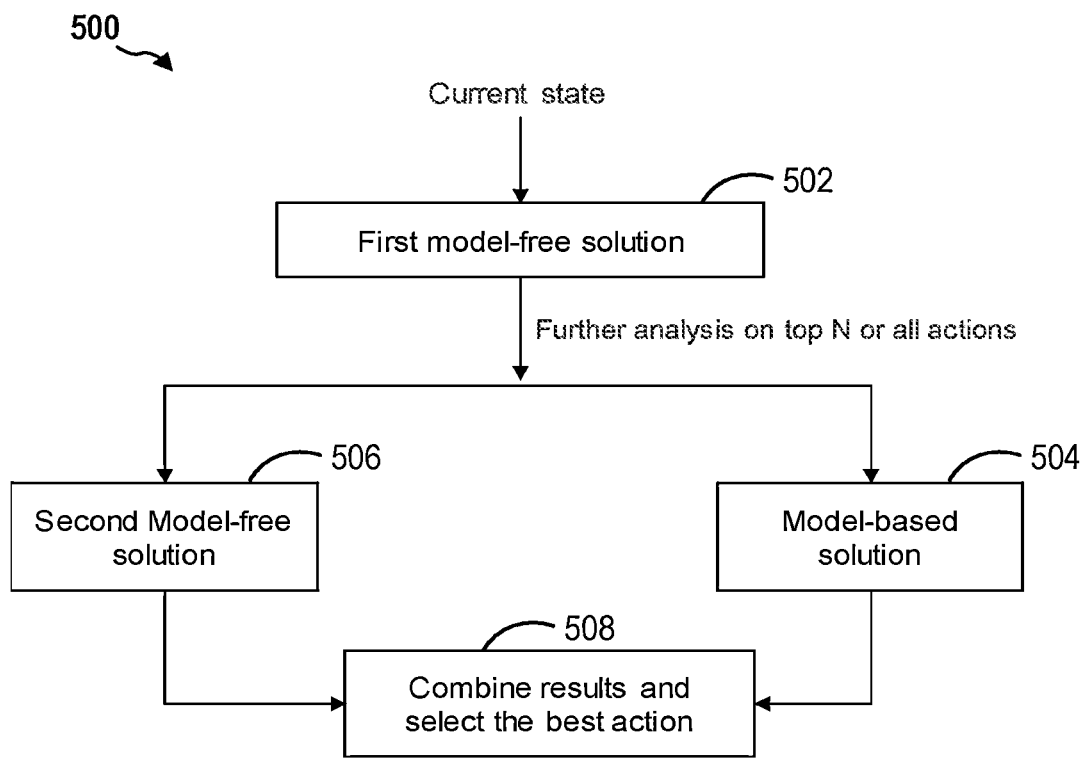

FIG. 5 illustrates another example of a solution 500 according to aspects of the present disclosure. The solution 500 of FIG. 5 may be referred to as a combination solution. As shown in FIG. 5, at block 502, the current state is input to a first model-free solution. The first model-free solution determines Q values for actions from the current state. The first model-free solution may also prune the actions to determine the top N actions. The top N actions may be processed by a second model-free solution (block 506) and a model-based solution (block 504). The second model-free solution (e.g., second model-free neural network) may be more complex than the first model-free solution (e.g., first model-free neural network).

At block 508, results of the second model-free solution and a model-based solution are combined and the action a* is selected from the combination. For example, the action a* may be selected as follows:

$$a^* = \operatorname{argmax}_{a \in A_N(s)} \{\alpha_1 Q(s, a) + \alpha_2 \tilde{Q}(s, a)\}.$$

In this configuration and other configurations, the first model-free solution is optional.

Figure 6:
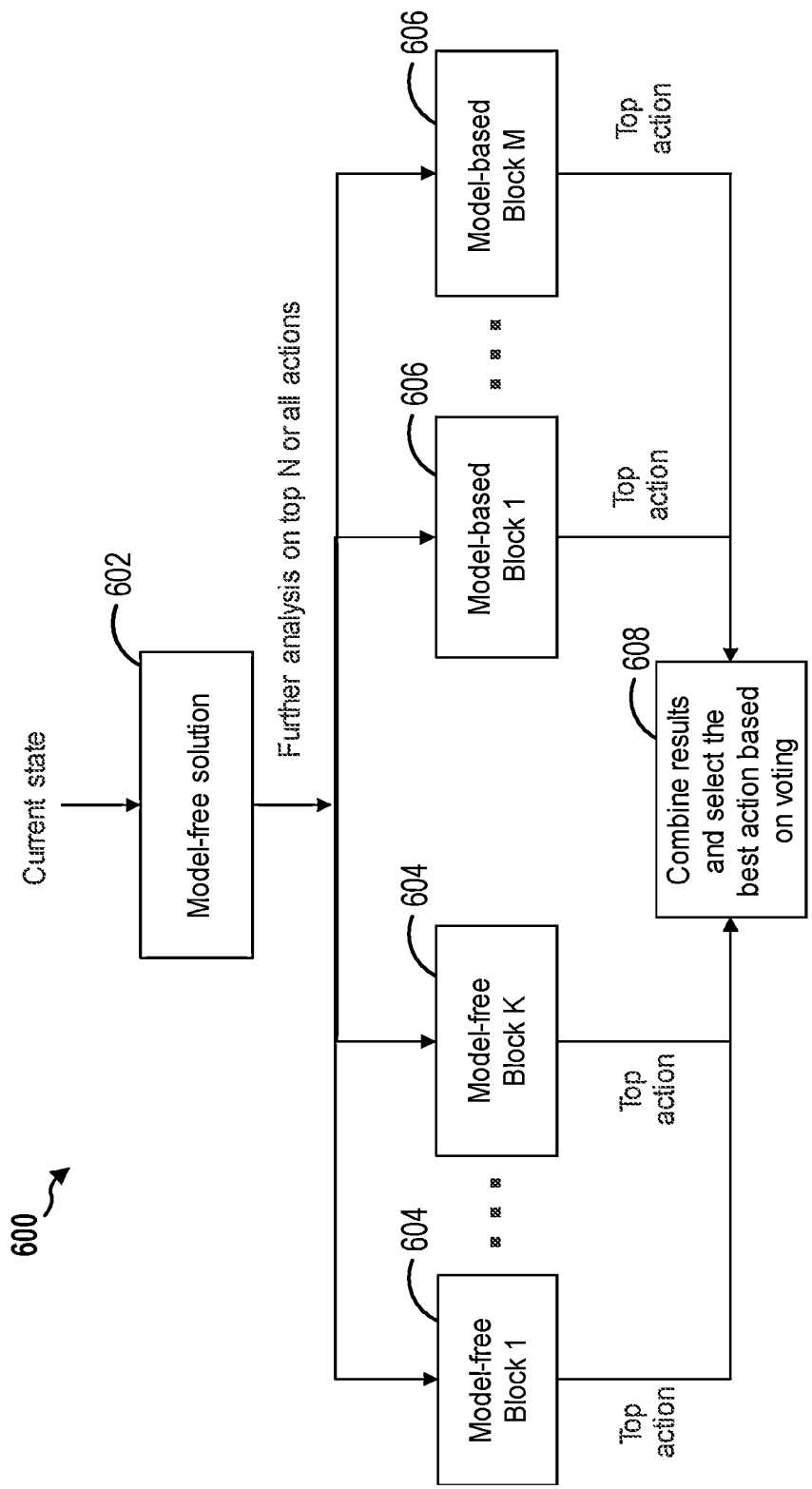

FIG. 6 illustrates another example of a solution 600 according to aspects of the present disclosure. The solution 600 of FIG. 6 may be referred to as a multi-block combination solution. As shown in FIG. 6, at block 602, the current state is input to a first model-free solution. The first model-free solution determines Q values for actions from the current state. The first model-free solution may also prune the actions to determine the top N actions.

The top N actions may be processed by a set of model-free solutions (1 to K) (block 604) and a set of model-based solutions (1 to M) (block 606). K may be different from or the same as M. At block 608, one or more actions from each block (1 to K and 1 to M) may be selected and combined. The best action is selected from the combination, for example, based on voting or some linear combination.

Each block (1 to K and 1 to M) may be different. That is, each block may be trained on different data. As another example, each block may be trained on the same data with different randomization of weights/parameters. Each block may have a different architecture. In one example, one block may be configured for a highway scenario and another block may be configured for a city street scenario. The model-free solutions have been trained on data. In contrast, the dynamics of an environment (e.g., scenario) are provided to the model-based solutions. In this example, the model-based solutions may be given different dynamics.

Aspects of the present disclosure may or may not recommend an action. For example, when there is a mismatch between Q values of an action of the model-based solution and the model-free solution, the hybrid solution may not recommend an action. Conventional systems generally always recommend an action. Conventional systems use a hybrid solution, which is cast as a Markov decision process. In contrast, aspects of the present disclosure may be extended to a partially observable Markov decision process.

Conventional systems train a neural network to predict a value function V and a policy P. Still, conventional systems do not use the value function V and the policy P for action selection. Rather, conventional systems use the value function V and policy P to improve forward simulations via a Monte Carlo tree search. In contrast to conventional systems, aspects of the present disclosure use a confidence of an outcome to determine whether to perform a tree search or further analysis.

In contrast to conventional hybrid solutions, aspects of the present disclosure consider the uncertainty of a Q value from a model-free solution before determining whether to proceed to a model-based solution or selecting actions to achieve a tradeoff between exploration/exploitation. Aspects of the present disclosure also consider the uncertainty of a Q value when determining how to combine model-free solution results with results of a model-based solution.

Figure 7:
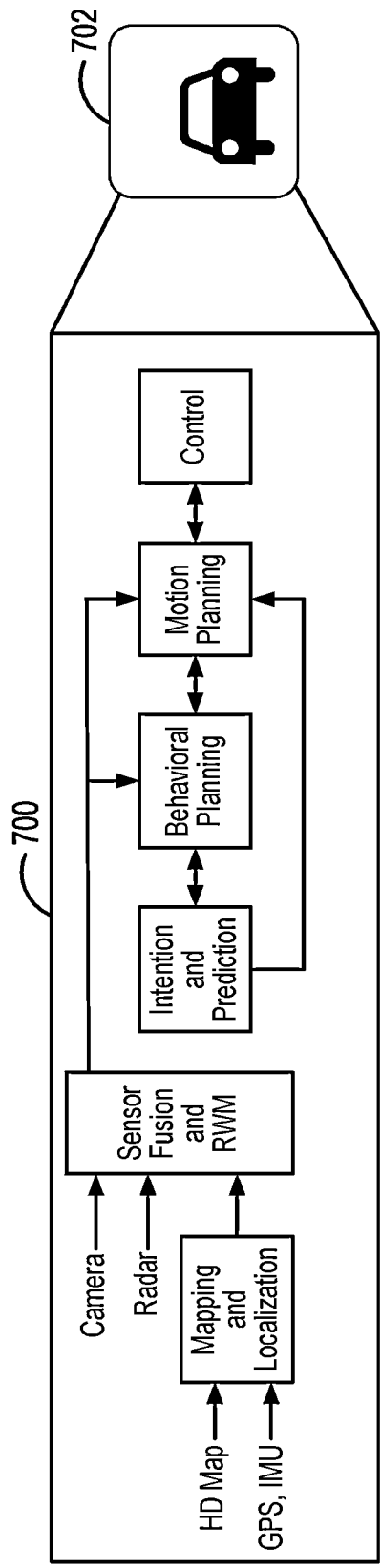
FIG. 7 illustrates an example of an autonomous driving system in accordance with aspects of the present disclosure.

FIG. 7 illustrates an example of an autonomous driving system 700 according to aspects of the present disclosure. As shown in FIG. 7, an autonomous vehicle 702 may include the autonomous driving system 700. The autonomous driving system 700 may include a mapping and localization module. The mapping and localization module may receive location information from a location sensor, such as a global positioning system (GPS) sensor and/or an inertial measurement unit (IMU) sensor. The mapping and localization module may also receive map information, such as high definition map information. The location information may be merged with the map information.

The autonomous driving system 700 may also include a sensor fusion and road world model (RWM) module. The sensor fusion module and road world model module receive the output from the mapping and localization module. Furthermore, the sensor fusion and road world model module receive information obtained from the vehicle's sensors, such as a vision sensor (e.g., camera) and a RADAR sensor. The sensor information may be used to track dynamic object states, such as pose, velocity, class, and/or residual uncertainty.

The autonomous driving system 700 may further include a prediction module (e.g., intention and prediction module) to determine a distribution over future trajectories(s) of dynamic objects for a subsequent time period (e.g., the next T seconds). The autonomous driving system 700 may still further include a behavior planning module that operates at a frequency (e.g., interval) such as 1 Hz. The behavior planning module outputs long term high-level decisions (e.g., keep/change lane) and parameters describing the high-level decisions. The parameters may include a maximum desired velocity, a time to finish lane change, and a lower/upper bound on acceleration, for example. The hybrid solution may be defined in the behavior planning module.

A motion planning module may operate at a frequency, such as 10 Hz. The motion planning module may plan trajectories and velocity profiles to execute the recommended maneuver determined by the behavior planning module. The motion planning module may handle collision avoidance as it may operate at a faster rate in comparison to the behavior planning module. As such, the motion planning module has an increased visibility to the output of the sensor fusion and road world model module. The motion planning module may override the behavior planning module. The override may initiate a default policy (e.g., stay in the lane, brake, etc.)

A control module may be used for low level control of the autonomous vehicle 702. The control module operates at a frequency, such as greater than or equal to 50 Hz. The control module may execute the trajectory determined by the motion planning module and/or smooth the trajectory determined by the motion planning module.

In one configuration, autonomous driving is modeled as a partially observable Markov decision process with a continuous and/or discrete state space, observation space, and action space. In some cases, parameters that are continuous in the real world, such as acceleration and velocity may be modeled as continuous in partially observable Markov decision process. Additionally, parameters, such as an upper and lower bound for velocity may be discretized. A state space may include observable states and hidden states. For autonomous driving, the observable states include the states of an ego vehicle and other vehicles. The hybrid reinforcement learning system controls the actions of the ego vehicle.

The observable states of the ego vehicle may include the vehicle's position, orientation, velocity, acceleration, map information (e.g., number of lanes, speed limit, etc.), and/or other information. The observable states of the other vehicles may include the vehicle's position, orientation, velocity, acceleration, object size, class (e.g., car, truck, bike, pedestrian, etc.), indicators (e.g., turn signal, brake light, etc.), and other information. The hidden states may include the intentions (e.g., future trajectories/actions) of the other vehicles. Furthermore, the sensor information may be noisy. In some cases, observable states may be perturbed by this sensor noise, and therefore may deviate from the true state.

The observation space may include information about the ego vehicle and approximate information for other vehicles (e.g., objects) within a certain radius of the ego vehicle. The radius may be dependent on a range of sensors of the ego vehicle. The observation space may also include uncertainty estimates (e.g., variance) for the information corresponding to the ego vehicle and other vehicles. For example, the observation space may indicate that a vehicle ahead of the ego vehicle is 100 meters ahead with a 10 meter variance.

The action space may include high-level options and parameters. The action space may be used by a behavior planning module. The high-level options may include adaptive cruise control, merge, lane change, stop/wait at intersection or traffic light, etc. A motion planner and low-level control modules may execute the high-level options. Each high-level option may include configurable parameters, such as a minimum distance from a lead vehicle, max/min/desired values for velocity/acceleration, a level of politeness to other vehicles, a direction and max time/distance of lane change, and/or other parameters.

Rewards may be determined for actions. A positive reward may be provided for keeping a safe distance, approaching a maximum desired speed, and successfully executing high-level options, such as a lane change or merge. A negative reward may be provided for increasing risk (relative distance to lead vehicle<safe distance) or passenger discomfort (high frequency of lane changes, high jerk, high lateral acceleration, etc.) The negative reward may also be provided if a motion planner cannot execute high-level options.

In one configuration, the action space is discretized. For example, for adaptive cruise control, the hybrid reinforcement learning system considers a discrete set of velocities as well as an absolute value or lower/upper bounds on acceleration. The set of velocities may be set to a fraction of the speed limit (e.g., [0, 0.25, 0.5, 0.75, 1] of the speed limit). For example, a sample action may be: a=[type=supercruise, v=0.5, headway=2 sec, politeness=0.75, acceleration_lower=−1, acceleration_upper=1, . . . ]

In this configuration, a model-free neural network is trained to predict state-action values (Q values). To achieve deep exploration, multiple bootstrapped networks may be trained. One network may be selected at random for a duration of each episode. The mean/variance of Q values for all actions is determined. For sample-efficient training, the variance may add bias toward selecting actions with higher uncertainty.

In this configuration, the top N actions of the trained model-free neural network(s) are identified. For a single neural network, the N actions may be the N with highest Q or $Q-\alpha\sigma^2$ values, where $Q-\alpha\sigma^2$ accounts for a scaled value of variance (e.g., uncertainty.) For bootstrapped neural networks, $\mathrm{argmax}_a(Q)$ or $\mathrm{argmax}_a(Q-\alpha\sigma^2)$ of each network is determined, and the N actions with a highest vote across all networks are selected.

After obtaining the N actions, a model-based solution that uses Monte Carlo tree search or its variants may be used to select the best action. A total number of Monte Carlo tree search iterations depends on various parameters, such as behavior planner frequency of decision making F, finite horizon T, and/or time step granularity $\Delta t$ (e.g., F=1 Hz, T=5 sec, $\Delta t$=100 ms). The dynamics model for the model-based solution may be a trajectory prediction model learned by an extended Kalman filter (EKF), and/or a recurrent neural network (e.g., long short-term memory (LSTM) network). Alternatively, the dynamics model for the model-based solution may be another model such as an intelligent driver model (IDM) or a minimize overall braking induced by lane changes (MOBIL) model.

In one configuration, for high-level options, the corresponding continuous parameters, such as velocity and acceleration, are not discretized. Additionally, the parametrization for high-level options may be predicted. That is, for each high-level option, a neural network is trained to generate a mean and a variance for the corresponding parameters. The parameter networks may be trained on auxiliary scenarios.

Figure 8:
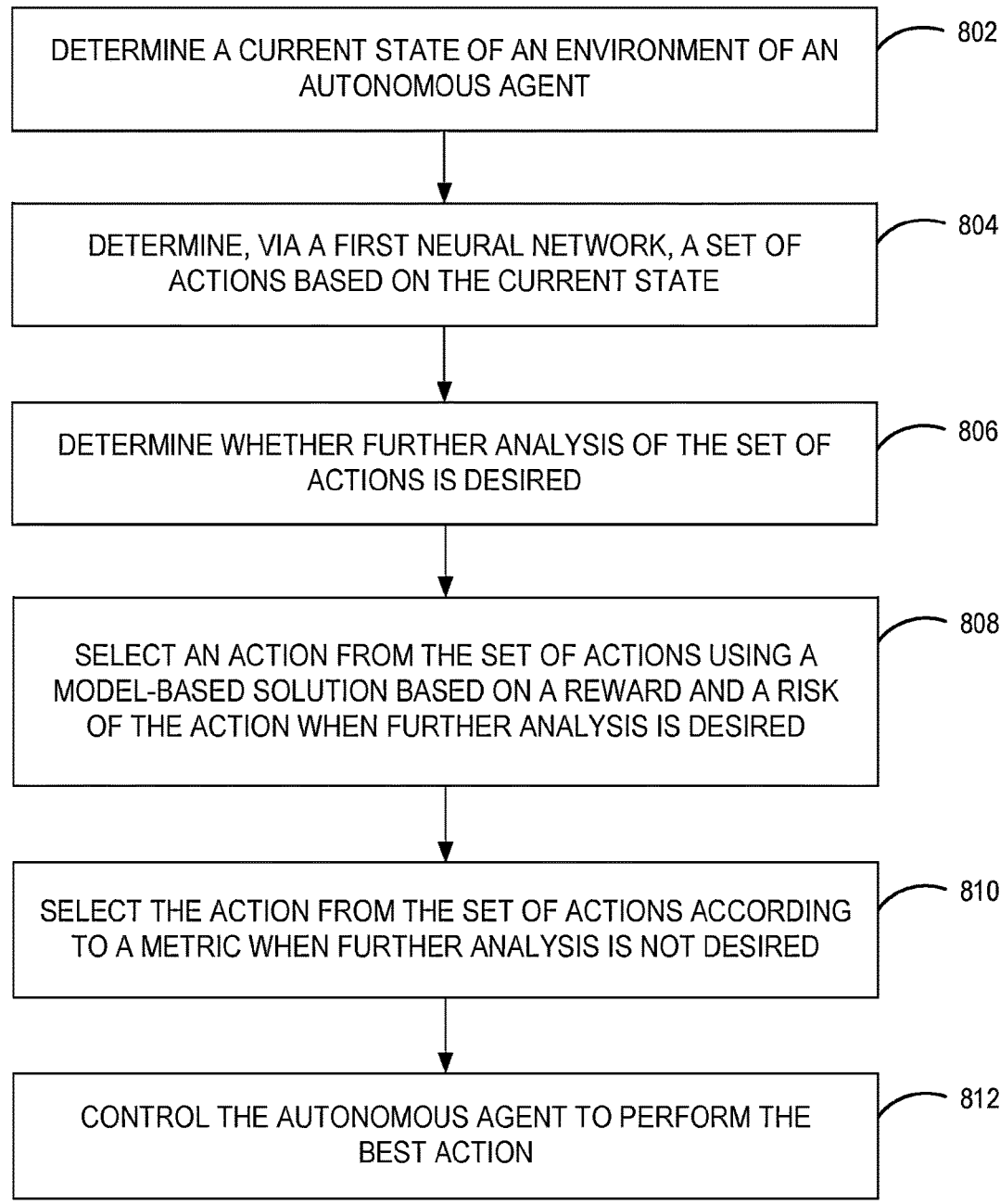
FIG. 8 illustrates a method for determining an action of an autonomous vehicle in accordance with aspects of the present disclosure.

FIG. 8 illustrates a method 800 according to an aspect of the present disclosure. In one configuration, the method 800 determines an action of an autonomous agent, such as an autonomous vehicle (e.g., automobile, drone, boat, etc.) At block 802, an autonomous system determines a current state of an environment of the autonomous agent. The current state may be determined (e.g., generated) via one or more sensors of the autonomous agent, such as an RGB camera, a LIDAR sensor, and/or a RADAR sensor. The autonomous system may have also determined one or more previous states of the environment. The current and previous states may include data regarding the ego agent, other agents, and/or the environment.

At block 804, the autonomous system determines, via a first neural network, a set of actions based on the current state. The first neural network may be a model-free solution or a model-free neural network. For each action, the first neural network may determine a utility function.

At block 806, the autonomous system determines whether further analysis of the set of actions is desired. The determination for further analysis may be based on a solution implemented by a decision making system. As discussed, the decision making system solutions may implement an analysis determination solution, a combination solution, or a multi-block combination solution (see FIGS. 4-6).

In one configuration, the autonomous system determines a utility function for each action in the set of actions. For example, the utility function may be a Q function that determines a Q value for an action a at a state s. Additionally, the autonomous driving system determines whether further analysis is desired based on the utility function for each action in the set of actions and a variance. The variance may be the variance of the Q value.

At block 808, the autonomous system selects an action from the set of actions using a model-based solution based on a reward and a risk of the action when further analysis is desired. For example, the action may be selected based on equation 1. At block 810, the autonomous system selects the action from the set of actions according to a metric when further analysis is not desired.

In an optional configuration, all actions or the top N actions determined by the first model-free neural network are separately processed with a second model-free neural network and a model-based solution. In this configuration, an action is selected from a combination of outputs (e.g., determined actions) of the second model-free neural network and the model-based solution.

In another optional configuration, all actions or the top N actions determined by the first model-free neural network are separately processed with a set of model-free neural networks and a set of model-based solutions. In this configuration, an action is selected from a combination of outputs (e.g., determined actions) of the set of model-free neural networks and the set of model-based solutions. The combination may be based on voting.

In one configuration, the action comprises a default action when a difference between outputs of the model-based solution and the model-free neural network is greater than a threshold value. The default action may include defaulting to the human driver or following a safety protocol (e.g., predetermined action). The difference may be computed by a utility function. For example, the mismatch may be computed by ranking the N actions based on their Q and $\tilde{Q}$ values. A distance between the two permutations may be determined by using a metric, such as a Cayley distance, Kendall distance, or their generalizations.

Finally, at block 812, the autonomous system controls the autonomous agent to perform the action. The action may be referred to as the best action. As an example, if the autonomous agent is a vehicle, the action may include changing a location (e.g., changing a lane), accelerating, decelerating, or another type of action. Additionally, the action may be one action of a sequence of actions.

In some aspects, the methods 400, 500, 600, 800 may be performed by the SOC 100 (FIG. 1). That is, each of the elements of the methods 400, 500, 600, 800 may, for example, but without limitation, be performed by the SOC 100 or one or more processors (e.g., CPU 102) and/or other included components.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method, comprising:
   determining a current state of an environment of an autonomous agent;
   determining, via a first neural network, a set of actions based on the current state;
   selecting an action from the set of actions using a model-based solution based on a reward for the action; and
   controlling the autonomous agent to perform the selected action.

2. The method of claim 1, further comprising determining a utility function for one or more actions in the set of actions.

3. The method of claim 1, further comprising:
   processing the set of actions with a second neural network;
   processing the set of actions with the model-based solution; and
   selecting the action from a combination of outputs of the second neural network and the model-based solution.

4. The method of claim 3, wherein the combination of outputs is based on voting.

5. The method of claim 1, wherein:
   the action comprises a default action when a difference between outputs of the model-based solution and the first neural network is greater than a threshold value; and
   the difference is computed by a utility function.

6. The method of claim 1, further comprising determining the current state of the environment based on at least one of a camera, a radio detection and ranging (RADAR) sensor, a light detection and ranging (LIDAR) sensor, or a combination thereof.

7. The method of claim 1, wherein the reward is a positive reward.

8. The method of claim 1, wherein the reward is a negative reward.

9. The method of claim 1, wherein the current state includes data regarding the autonomous agent.

10. An apparatus comprising:
    a memory; and
    at least one processor coupled to the memory, the at least one processor configured to:
      determine a current state of an environment of an autonomous agent;
      determine, via a first neural network, a set of actions based on the current state;
      select an action from the set of actions using a model-based solution based on a reward for the action; and
      control the autonomous agent to perform the selected action.

11. The apparatus of claim 10, wherein the at least one processor is further configured to determine a utility function for one or more actions in the set of actions.

12. The apparatus of claim 10, wherein the at least one processor is further configured to:
    process the set of actions with a second neural network;
    process the set of actions with the model-based solution; and
    select the action from a combination of outputs of the second neural network and the model-based solution.

13. The apparatus of claim 12, wherein the combination of outputs is based on voting.

14. The apparatus of claim 10, wherein:
    the action comprises a default action when a difference between outputs of the model-based solution and the first neural network is greater than a threshold value; and
    the difference is computed by a utility function.

15. The apparatus of claim 10, wherein the at least one processor is further configured to determine the current state of the environment based on at least one of a camera, a radio detection and ranging (RADAR) sensor, a light detection and ranging (LIDAR) sensor, or a combination thereof.

16. The apparatus of claim 10, wherein the reward is a positive reward.

17. The apparatus of claim 10, wherein the reward is a negative reward.

18. The apparatus of claim 10, wherein the current state includes data regarding the autonomous agent.

19. The apparats of claim 10, wherein the apparatus comprises the autonomous agent.

20. A non-transitory computer-readable medium having program code recorded thereon, the program code executed by a processor and comprising:
    program code to determine a current state of an environment of an autonomous agent;
    program code to determine, via a first neural network, a set of actions based on the current state;
    program code to select an action from the set of actions using a model-based solution based on a reward for the action; and
    program code to control the autonomous agent to perform the selected action.

* * * * *